(12) United States Patent
Resler et al.

(10) Patent No.: US 7,140,729 B2
(45) Date of Patent: Nov. 28, 2006

(54) CHILDREN'S SUNGLASSES

(76) Inventors: Renee Resler, 6602 N. 31st St., Phoenix, AZ (US) 85016; Gary W. Hall, 5600 Camino del Contento, Paradise Valley, AZ (US) 85253

(*) Notice: Subject to any disclaimer, the term of this patent is extended or adjusted under 35 U.S.C. 154(b) by 57 days.

(21) Appl. No.: 10/997,113

(22) Filed: Nov. 24, 2004

(65) Prior Publication Data

US 2006/0109418 A1 May 25, 2006

(51) Int. Cl.
*G02C 3/00* (2006.01)

(52) U.S. Cl. .................. 351/156; 351/41; 351/63; 351/157; 351/158

(58) Field of Classification Search ............ 351/156, 351/157, 41, 158, 63; 2/452, 454, 426
See application file for complete search history.

(56) References Cited

U.S. PATENT DOCUMENTS

| | | | |
|---|---|---|---|
| 4,520,510 A | 6/1985 | Daigle | |
| 5,268,710 A | 12/1993 | Anstey | |
| 5,781,273 A | 7/1998 | Boden | |
| 5,818,569 A | 10/1998 | Berent | |
| 5,940,892 A | 8/1999 | Morgan | |
| 6,059,408 A | 5/2000 | Bonacci | |
| 6,186,624 B1 | 2/2001 | Wang | |
| 6,513,925 B1 | 2/2003 | Bonacci | |
| 6,530,659 B1 * | 3/2003 | Marcum | ............... 351/41 |

* cited by examiner

*Primary Examiner*—Hung Xuan Dang
(74) *Attorney, Agent, or Firm*—Parsons & Goltry; Michael W. Goltry; Robert A. Parsons

(57) ABSTRACT

Sunglasses for infants and children includes an elongate integral member including a central portion having a central nose bridge, a lens opening on each side of the central nose bridge, and a temple extending rearwardly of the central portion at a bend in the elongate integral member on each side of the central portion. A lens-defining member is affixed to the central portion, and an elongate integral backing is affixed to the lens-defining member. The backing includes a central nose bridge opposing the central nose bridge of the central portion, and a lens opening on each side of the central nose bridge opposing the lens opening on each side of the central portion. A nose bridge pad is affixed to the backing, and a temple pad is affixed to the backing at each side thereof and to the temples maintaining the bends in the elongate integral member.

51 Claims, 9 Drawing Sheets

CHILDREN'S SUNGLASSES

FIELD OF THE INVENTION

The present invention relates to sunglasses and, more particularly, to children's sunglasses, such as for infants and small children.

BACKGROUND OF THE INVENTION

Everyone is at risk for eye damage from the sun. The same harmful rays that damage skin can also increase the risk of developing eye problems. Some of the long-term effects of UV radiation happen slowly and painlessly. Research has found that UV and other sun rays are involved in many of the serious eye disorders people experience today.

In the short-term, people who spend long hours on the beach or in the snow without adequate eye protection can develop photokeratitis, sunburn of the cornea, which can cause temporary loss of vision. The sunlight's reflection off of snow, sand or water, further increases a person's exposure to solar radiation.

Most people are unfamiliar with the sensitive nature of their eyes. According to optometrists and ophthalmologists, there are three surfaces within the eye that can be adversely affected by sunlight—the cornea and conjunctiva (snow-blindness and pterygium), the lens (cataracts), and the retina (eclipse blindness and macular degeneration). These surfaces perform different functions that work together as the backbone of the eye structure. In addition, the eyelids are at risk of developing skin cancer from UV exposure.

To protect eyes from both short and long-term damage, people should wear sunglasses that block the sun's harmful rays. Pricey sunglasses or glasses with a dark tint don't always offer more protection. People should look for labels that specifically say the glasses offer 99 percent to 100 percent UV protection. Some eye-care professionals can also test the UV protection level of sunglasses for a customer.

Tint of the sunglass lens does play a role in the amount of protection. Amber or brown lenses, for example, may distort colors. However, they will attenuate most or all of the shortest wavelengths in the visible spectrum, which may contribute to macular degeneration in the retina.

The style or frame coverage of the sunglass also affects the amount of scattered or reflected harmful radiation, which can reach the eye without transmitting through the lens. Wrap-around sunglasses, which fit close to the face offer more solar protection than small frames.

People who wear contact lenses that offer UV protection should still wear sunglasses for total eye protection.

Children should also wear sunglasses that indicate a high UV-protection level, and not toy glasses without a label. Polycarbonate lenses are generally recommended for children because they are the most shatter-resistant.

The prior art has provided numerous specific configurations of children's sunglasses. None, however, have proven to be entirely satisfactory. Some prior art children's sunglasses are difficult to construct, expensive, and so uncomfortable to wear that children refuse to wear them. Moreover, some children's sunglasses are not suitable for very small children or infants, as the frames and other parts are relatively rigid and subject to breaking, which products have relatively sharp edges that can injure an infant or small child, or small parts which may break free causing injury.

SUMMARY OF THE INVENTION

It is an object of the invention to provide sunglasses that are specifically-adapted to be worn by infants and children which are low in cost, which are safe, which are disposable, which are comfortable, and that are easy to assemble and convenient to use.

According to the invention, provided are sunglasses for infants and children including an elongate integral member that consists of a central portion having opposing outer and inner faces, a central nose bridge, a lens opening on each side of the central nose bridge, and a temple extending from each side of the central portion, in which each of the temples has an outer face that is congruent with the outer face of the central portion and an inner face that is congruent with the inner face of the central portion. A lens-defining member, made of a flexible, thin, sun-protective, light-transmitting material, has an outer face affixed to the inner face of the central portion and an opposing inner face. The lens-defining member is substantially coextensive relative to the central portion and has a side in juxtaposition to each of the sides of the central portion. An elongate integral backing has an outer face affixed to the inner face of the lens-defining member and an opposing inner face, in which the backing is substantially coextensive relative to, and a substantial mirror image of, the central portion including a central nose bridge opposing the central nose bridge of the central portion, a lens opening on each side of the central nose bridge opposing the lens opening on each side of the central portion, and a side in juxtaposition to each of the sides of the central portion. A nose bridge pad is affixed to the inner face of the backing at the nose bridge thereof. The temples each have a free end, and an engagement assembly is provided for releasably retaining the free end of one of the temples to the free end of the other of the temples. In a preferred embodiment, the engagement assembly includes a hook and loop fastener having an element thereof carried at the free end of one of the temples and a complemental element thereof carried at the free end of the other of the temples. Preferably, the elongate integral member is made of a foam material, the backing is made of a foam material, and the nose bridge pad is made of a foam material. In a particular embodiment, the nose bridge pad is adhesively affixed to the inner face of the backing. In another embodiment, the nose bridge pad is integrally affixed to the inner face of the backing.

According to the invention, there is provided a method of fabricating sunglasses includes 1) providing an elongate integral member, the elongate integral member including a central portion having opposing outer and inner faces, a central nose bridge, and a lens opening on each side of the central nose bridge; 2) providing a lens-defining member, made of a flexible, thin, sun-protective, light-transmitting material, having opposing outer and inner faces, opposing sides, and that is substantially coextensive relative to the central portion; 3) providing an elongate integral backing that is substantially coextensive relative to, and a substantial mirror image of, the central portion, the backing having opposing outer and inner faces, opposing sides, a central nose bridge, and a lens opening on each side of the central nose bridge; and 4) affixing the outer face of the lens-defining member to the inner face of the central portion, and affixing the outer face of the backing to the inner face of the lens-defining member, wherein the sides of the lens-defining member juxtaposed relative to the sides of the backing, respectively. The instant method further includes affixing a nose bridge pad to the inner face of the backing at the nose bridge thereof. The temples each have a free end, and the method further includes providing an engagement assembly for releasably retaining the free end of one of the temples to the free end of the other of the temples. In a preferred embodiment, the engagement assembly includes a hook and loop fastener having an element thereof carried at the free end of one of the temples and a complemental element thereof carried at the free end of the other of the temples. Preferably, the elongate integral member is made of a foam material, the backing is made of a foam material, and the nose bridge pad is made of a foam material. In a particular embodiment, the step of affixing the nose bridge pad further includes adhesively affixing the nose bridge pad. In another embodiment, the step of affixing the nose bridge pad further includes integrally affixing the nose bridge pad.

According to the invention, provided are sunglasses for infants and children including an elongate integral member that consists of a central portion having opposing outer and inner faces, a central nose bridge, a lens opening on each side of the central nose bridge, and a temple extending rearwardly of the inner face from a bend in the elongate integral member on each side of the central portion. Each of the temples has an outer face that is congruent with the outer face of the central portion, and an inner face that is congruent with the inner face of the central portion. A lens-defining member is made of a flexible, thin, sun-protective, light-transmitting material, which has an outer face affixed to the inner face of the central portion and an opposing inner face, wherein the lens-defining member is substantially coextensive relative to the central portion, and a side in juxtaposition to each of the bends of the central portion. An elongate integral backing has an outer face affixed to the inner face of the lens-defining member, and an opposing inner face. The backing is substantially coextensive relative to, and a substantial mirror image of, the central portion, and includes a central nose bridge opposing the central nose bridge of the central portion, a lens opening on each side of the central nose bridge opposing the lens opening on each side of the central portion, and a side in juxtaposition to each of the bends of the central portion. A nose bridge pad is affixed to the inner face of the backing at the nose bridge thereof. A temple pad is affixed to the inner face of the backing at each side thereof and to the inner face of each of the temples maintaining the bends in the elongate integral member. The temples each have a free end, and an engagement assembly is provided for releasably retaining the free end of one of the temples to the free end of the other of the temples. Preferably, the engagement assembly includes a hook and loop fastener having an element thereof carried at the free end of one of the temples and a complemental element thereof carried at the free end of the other of the temples. Preferably, the elongate integral member is made of a foam material, the backing is made of a foam material, and the nose bridge pad and the temple pads are each made of a foam material. In one embodiment, the nose bridge pad is adhesively affixed to the inner face of the backing. In another embodiment, the nose bridge pad is integrally affixed to the inner face of the backing. In one embodiment, the temple pads are adhesively affixed to the inner face of the backing. In one embodiment, the temple pads are adhesively affixed to the inner faces of the temples, respectively. In another embodiment, the temple pads are integrally affixed to the inner face of the backing.

According to the invention, there is provided a method of fabricating sunglasses suitable for infants and children including steps of 1) providing an elongate integral member, the elongate integral member including a central portion having opposing outer and inner faces, a central nose bridge, and a lens opening on each side of the central nose bridge; 2) providing a lens-defining member, made of a flexible, thin, sun-protective, light-transmitting material, having opposing outer and inner faces, opposing sides, and that is substantially coextensive relative to the central portion; 3) providing an elongate integral backing that is substantially coextensive relative to, and a substantial mirror image of, the central portion, the backing having opposing outer and inner faces, opposing sides, a central nose bridge, and a lens opening on each side of the central nose bridge; 4) affixing the outer face of the lens-defining member to the inner face of the central portion, and affixing the outer face of the backing to the inner face of the lens-defining member, wherein the sides of the lens-defining member juxtaposed relative to the sides of the backing, respectively; 5) bending the elongate integral member rearwardly of the inner face thereof at the juxtaposed sides of the lens-defining member and the backing forming bends and temples in the elongate integral member; 6) the temples each having an outer face that is congruent to the outer face of the central portion and an inner face that is congruent with the inner face of the central portion; 7) affixing a nose bridge pad to the inner face of the backing at the nose bridge thereof; and 8) affixing a temple pad to the inner face of the backing at each side thereof and to the inner face of each of the temples maintaining the bends in the elongate integral member. The temples each have a free end, and the method further includes providing an engagement assembly for releasably retaining the free end of one of the temples to the free end of the other of the temples. Preferably, the engagement assembly includes a hook and loop fastener having an element thereof carried at the free end of one of the temples and a complemental element thereof carried at the free end of the other of the temples. Preferably, the elongate integral member is made of a foam material, the backing is made of a foam material, and the nose bridge pad and the temple pads are each made of a foam material. In one embodiment, the step of affixing the nose bridge pad further includes adhesively affixing the nose bridge pad. In another embodiment, the step of affixing the nose bridge pad further includes integrally affixing the nose bridge pad. In one embodiment, the step of affixing a temple pad to the inner face of the backing at each side thereof further includes adhesively affixing a temple pad to the inner face of the backing at each side thereof. In one embodiment, the step of affixing a temple pad to the inner face of each of the temples further includes adhesively affixing a temple pad to the inner face of each of the temples. In another embodiment, the step of affixing a temple pad to the inner face of the backing at each side thereof further includes integrally affixing a temple pad to the inner face of the backing at each side thereof.

According to the invention, there is provided sunglasses for infants and children including an elongate integral member that consists of a central portion having opposing outer and inner faces, a central nose bridge, a lens opening on each side of the central nose bridge, and a temple extending rearwardly of the inner face from a bend in the elongate integral member on each side of the central portion, in which each of the temples having an outer face that is congruent with the outer face of the central portion and an inner face that is congruent with the inner face of the central portion. A lens-defining member, made of a flexible, thin, sun-protective, light-transmitting material, has an outer face affixed to the inner face of the central portion and an opposing inner face. The lens-defining member is substantially coextensive relative to the central portion and has a side in juxtaposition to each of the bends of the central portion. An elongate integral backing is affixed to the inner face of the lens-defining member including a central nose bridge opposing the central nose bridge of the central portion, a lens opening on each side of the central nose bridge opposing the lens opening on each side of the central portion, a side in juxtaposition to each of the bends of the central portion, a nose bridge pad at the nose bridge of the backing, and a temple pad at each side of the backing and affixed to the inner face of each of the temples maintaining the bends in the elongate integral member. The temples each have a free end, and an engagement assembly is provided for releasably retaining the free end of one of the temples to the free end of the other of the temples. Preferably, the engagement assembly includes a hook and loop fastener having an element thereof carried at the free end of one of the temples and a complemental element thereof carried at the free end of the other of the temples. Preferably, the elongate integral member is made of a foam material, and the backing is made of a foam material.

According to the invention, there is provided a method of fabricating sunglasses suitable for infants and children including steps of 1) providing an elongate integral member, the elongate integral member including a central portion having opposing outer and inner faces, a central nose bridge, and a lens opening on each side of the central nose bridge; 2) providing a lens-defining member, made of a flexible, thin, sun-protective, light-transmitting material, having opposing outer and inner faces, opposing sides, and that is substantially coextensive relative to the central portion; 3) providing an elongate integral backing that is substantially coextensive relative to the central portion, the backing having a central nose bridge, a lens opening on each side of the central nose bridge, opposing sides, a nose bridge pad at the nose bridge of the backing, and a temple pad at each side of the backing; 4) affixing the outer face of the lens-defining member to the inner face of the central portion, and affixing the backing to the inner face of the lens-defining member, wherein the sides of the lens-defining member juxtaposed relative to the sides of the backing, respectively; 5) bending the elongate integral member rearwardly of the inner face thereof at the juxtaposed sides of the lens-defining member and the backing forming bends and temples in the elongate integral member; 6) the temples each having an outer face that is congruent to the outer face of the central portion and an inner face that is congruent with the inner face of the central portion; and 7) affixing the temple pads to the inner faces of the temples, respectively, maintaining the bends in the elongate integral member. The temples each have a free end, and the method further includes providing an engagement assembly for releasably retaining the free end of one of the temples to the free end of the other of the temples. Preferably, the engagement assembly includes a hook and loop fastener having an element thereof carried at the free end of one of the temples and a complemental element thereof carried at the free end of the other of the temples. Preferably, the elongate integral member is made of a foam material, and the backing is made of a foam material. In one embodiment, the step of affixing the temple pads to the inner faces of the temples, respectively, further includes adhesively affixing the temple pads to the inner faces of the temples, respectively.

Consistent with the foregoing summary of preferred embodiments of the invention, and the ensuing disclosure, which are to be taken together, the invention also contemplates associated apparatus and method embodiments.

BRIEF DESCRIPTION OF THE DRAWINGS

Referring to the drawings.

DETAILED DESCRIPTION OF PREFERRED EMBODIMENTS

Figure 1:
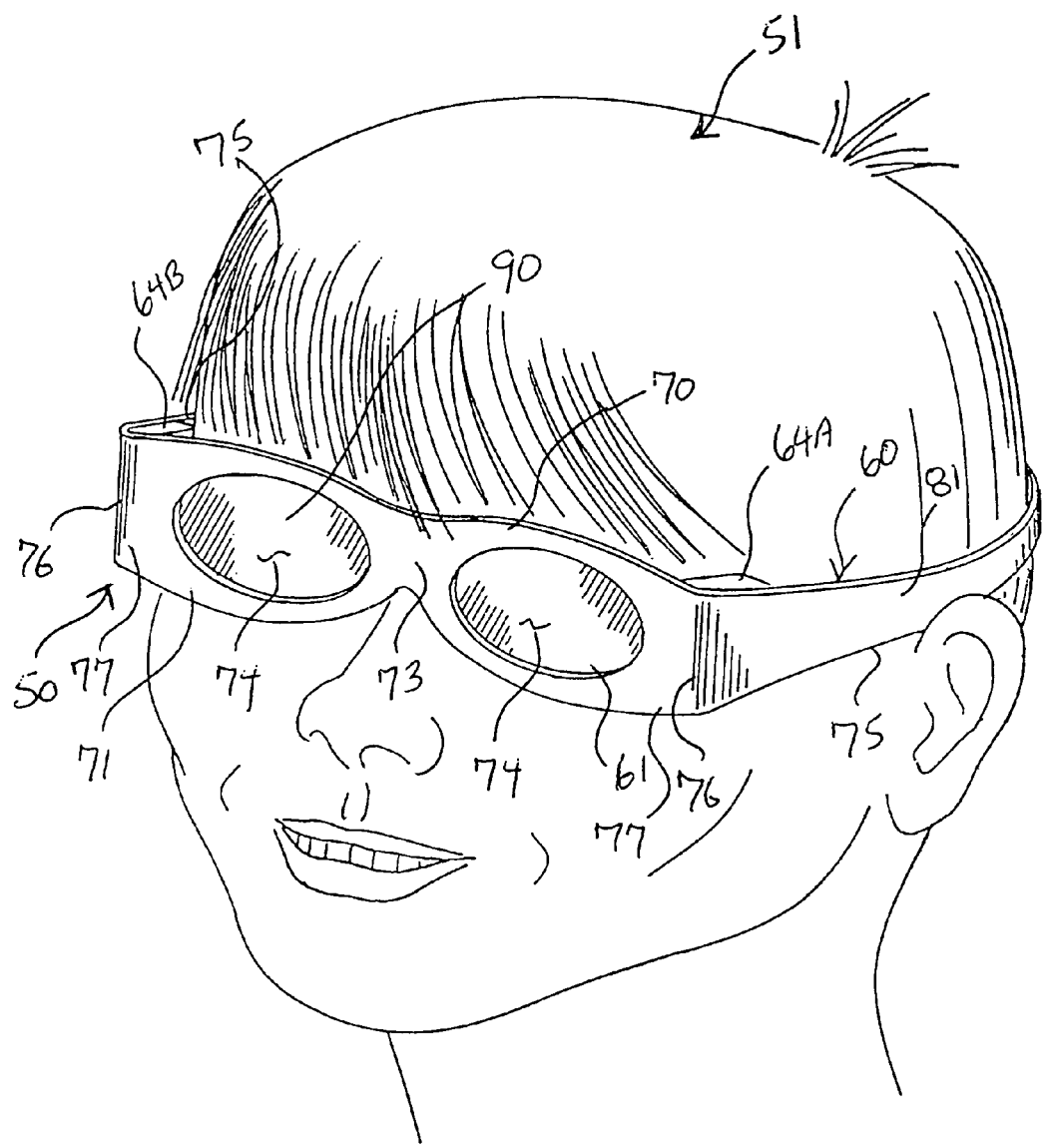
FIG. 1 is a perspective view of sunglasses, constructed in accordance with the principles of the instant invention, as they would appear worn by a user.

Turning now to the drawings, in which like reference characters indicate corresponding elements throughout the several views, attention is first directed to FIG. 1, in which are seen sunglasses, embodying the principles of the instant invention and generally designated by the reference character 50. In FIG. 1, sunglasses 50 are shown as they would appear being worn upon the head of a user, generally designated by the reference character 51.

Figure 4:
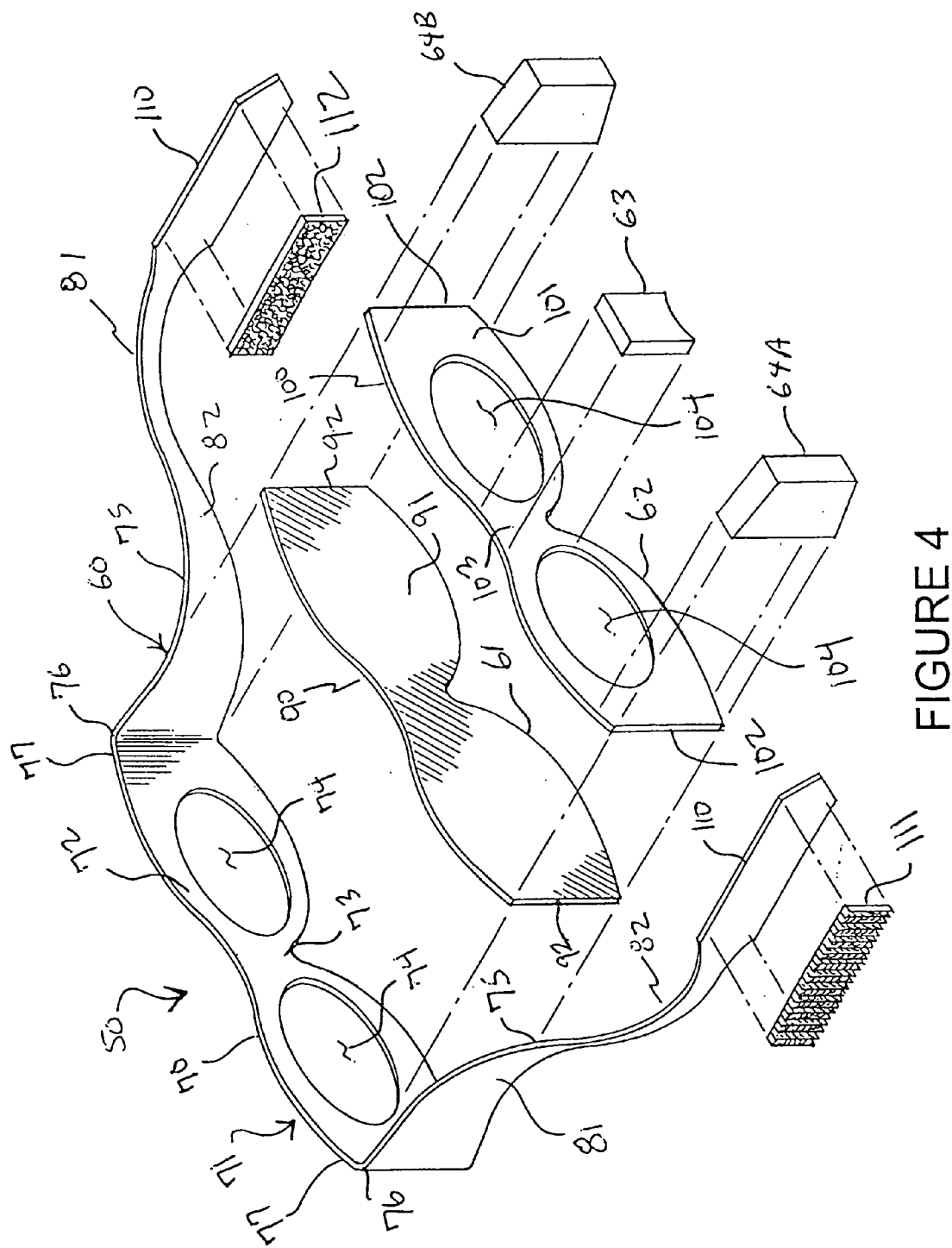
FIG. 4 is another exploded perspective view of the sunglasses of FIG. 1.

Referring to FIG. 4, sunglasses 50 includes an elongate member 60, a lens-defining member 61, and a backing 62. Further included are a nose bridge pad 63, and temple pads 64A and 64B. Member 60, backing 62, nose bridge pad 63, and temple pads 64A and 64B are each made of a foam material, such as a polyurethane-type foam material, an ethyl vinyl acetate foam material, or other similar foam material, of the same or different porosity, which is lightweight, flexible, and without sharp edges and which is printable or embossable, such as for decoration and for branding and information purposes.

Member 60 is a single, integral element formed by molding, or by cutting it away from a single piece of material. Backing 62 is also a single, integral element formed by molding, or by cutting it away from a single piece of material. Still further, nose bridge pad 64 and temple pads 64A and 64B are also single, integral elements each formed by molding, or by cutting away from a single piece of material.

Lens-defining member 61 is a single, integral piece of material made of a thin plastic light-transmitting material of a sun-protecting composition or color, preferably a thermosetting material. Lens-defining member 61 is of a type that blocks the sun's harmful UV light. Preferred materials are a high-performance Lexan™ film, or a polycarbonate film, both of which have the desirable properties of providing ultraviolet protection, being shatter and chemical resistant and lightweight and flexible. Where desired, other materials may be used, including materials suitable for forming optical lenses or curvatures prescribed for the individual wearer.

Member 60 includes a central portion 70 having opposing outer and inner faces 71 and 72, a central nose bridge 73, a lens opening 74 on each side of central nose bridge 73, and a temple 75 extending rearwardly of inner face 72 from a bend 76 in member 60 on each side 77 of central portion 70. Each temple 75 has an outer face 81 that is congruent with outer face 71 of central portion 70, and an inner face 82 that is congruent with the inner face 72 of central portion 70. Lens openings 74 are each substantially equal in size.

Lens-defining member 61 is superimposed on inner face 72 of central portion 70, and is substantially coextensive relative to central portion 70. More particular, lens-defining member 61 has opposing outer and inner faces 90 and 91, and opposing sides 92. Outer face 90 is adhesively affixed with a suitable adhesive to inner face 72 of central portion 70, being superimposed thereon and overlying lens openings 74 in which sides 92 are juxtaposed to bends 76 and, moreover, to sides 77 of central portion 70. Preferably, opposing parallel edges characterize sides 92, and bends 76 are formed thereabout these parallel edges at sides 77.

Figure 2:
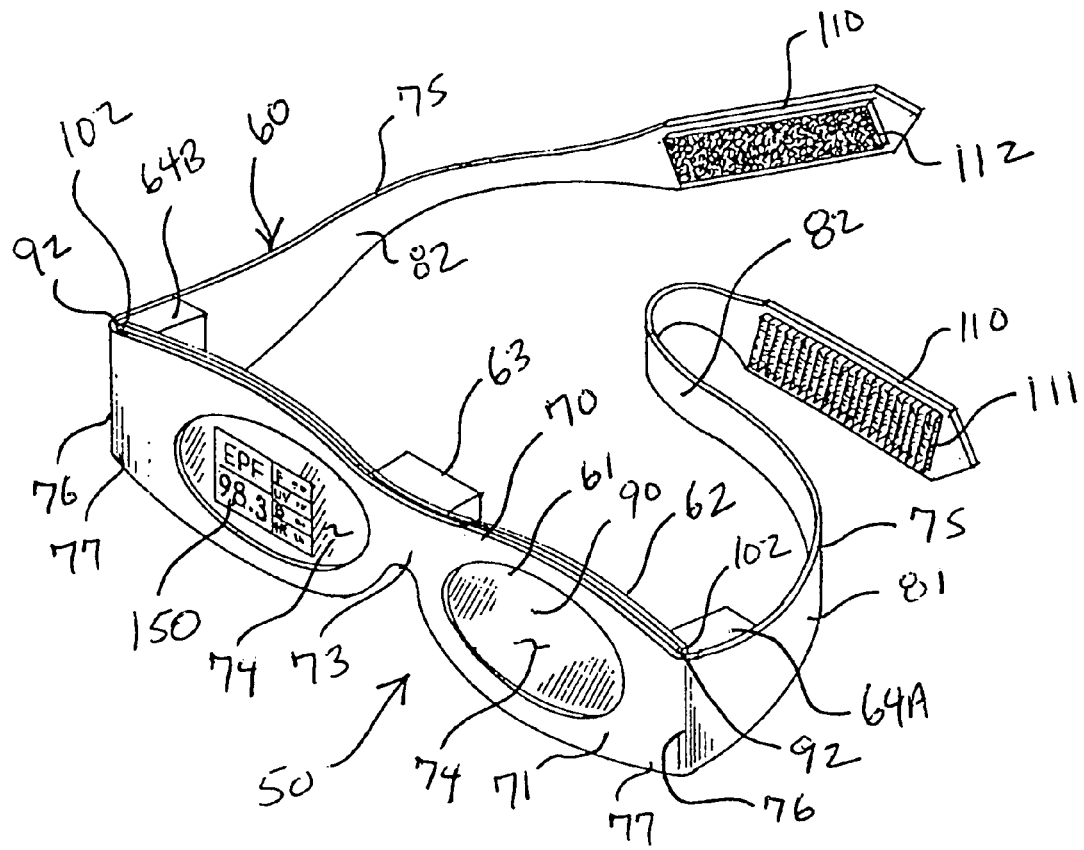
FIG. 2 is a perspective view of the sunglasses of FIG. 2.
Figure 3:
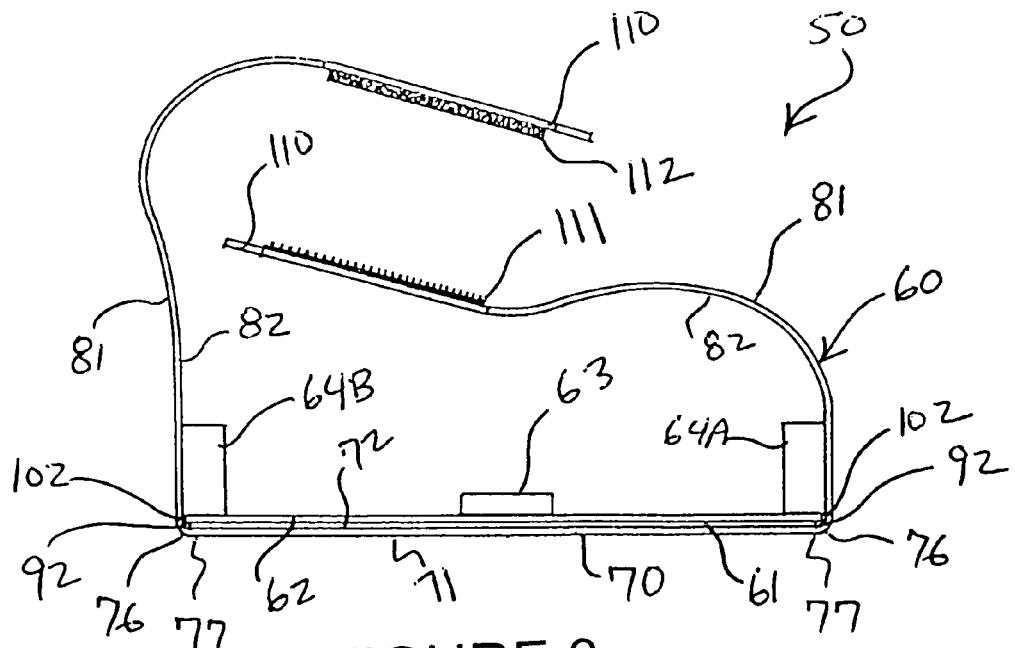
FIG. 3 is a top plan view of the sunglasses of FIG. 1.

Backing 62 is superimposed on outer face 91 of lens-defining member, and is substantially coextensive relative to, and a substantial mirror image of, central portion 70. Backing 62 is also substantially coextensive relative to lens-defining member 61. More particularly, backing 62 has opposing outer and inner faces 100 and 101, opposing sides 102, a central nose bridge 103, and lens openings 104 on each side of central nose bridge 103. Outer face 100 is adhesively affixed with a suitable adhesive to inner face 91 of lens-defining member 61, being superimposed thereon and also over central portion 70, in which lens-defining member 61 is sandwiched between inner face 72 of central portion 70 and outer face 100 of backing 62 and lens openings 104 oppose and are aligned with lens openings 74, respectively, and central nose bridge 103 opposes central nose bridge 73. Sides 102 are juxtaposed to sides 92, respectively, and to bends 76, respectively, and, moreover, to sides 77. Preferably, opposing parallel edges characterize sides 102, and bends 76 are formed not only thereabout the parallel edges of sides 92, but also the parallel edges of sides 102. The attachment of lens-defining member 61 to central portion 70, and backing 62 to lens-defining member 61, which forms a laminate lensed frame portion of sunglasses 50, is clearly shown in FIGS. 2 and 3, forming an exemplary embodiment of the invention. FIGS. 2 and 3 also show the relationship between bends 76 and sides 92 and 102 of lens-defining member 61 and backing 62, respectively.

Nose bridge pad 63 is adhesively affixed with a suitable adhesive to outer face 103 of backing 62 at nose bridge 103. Temple pads 64A and 64B are positioned in the inside corners of sunglasses 50 formed at bends 76, which bends 76 are formed by the juxtaposed inner faces of central portion 70 and temples 75, and are affixed to outer face 101 of backing 62 at sides 92, respectively, on either side of lens openings 104, and to inner faces 82 of temples 75 maintaining bends 76 in member 70, in accordance with the principle of the invention. The attachment of nose bridge pad 63 and temple pads 64A and 64B is shown in FIGS. 2 and 3.

Each temple 75 has a free end 110, which free ends 110 are capable of being secured to one another forming a head band for securing sunglasses 50 to a user's head as shown in FIG. 1. An engagement assembly is provided for releasably securing free ends 110. Preferably, the engagement assembly includes a hook and loop fastener having an element 111 thereof carried at one free end 110, and a complemental element 112 thereof carried at the other free end 110. In this particular embodiment designated at 50, element 111 is a hook element of a hook and loop fastener, and complemental element 112 is a loop element of a hook and loop fastener. This arrangement can be reversed, if desired. Elements 111 and 112 are secured in place with a suitable adhesive, in which element 111 is disposed on outer face 81 of the free end of one temple 75, and element 112 is disposed on inner face 82 of the free end of the other temple 75, and this facilitates the convenient attachment of element 111 to complemental element 112. This arrangement can be reversed, if desired.

When sunglasses 50 are worn as in FIG. 1, outer face 101 of backing 62 is presented toward the user and nose bridge and temple pads 63,64A,64B are presented against user's 51 face, in which nose bridge pad 63 presents against the bridge of user's 51 nose, temple pads 64A and 64B present against user's 51 temples, and free ends 110 are releasably secured forming a head band about user's 51 head which holds sunglasses 50 in place. Nose bridge pad 63 and temple pads 64A,64B provide the user with a comfortable fit, and function to keep the front of sunglasses away from the user's face, which prevents lens-defining member 61 from contacting the user's face and becoming obscured with sweat and other bodily oils, which prevents lens defining member 61 from fogging up, and which provides ventilation between the sunglasses and the user's face. Also, it is to be noted that the sides of temples 75 adjacent bends 76 are widened for blocking sunlight from the sides, while lens-defining member 61 blocks the sun's harmful UV light protecting the user's eye's from the sun.

Figure 10:
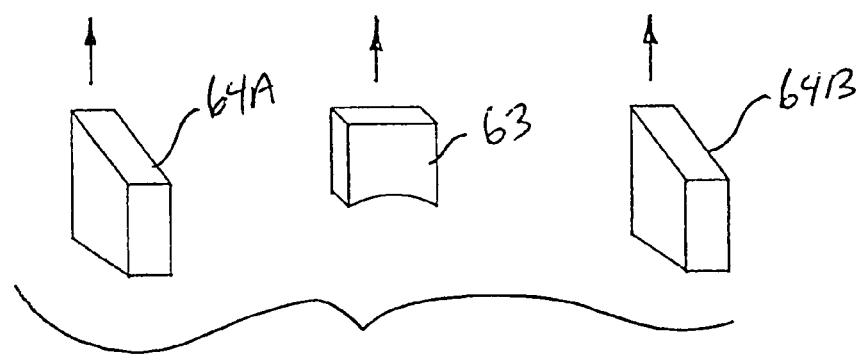
Figure 11:
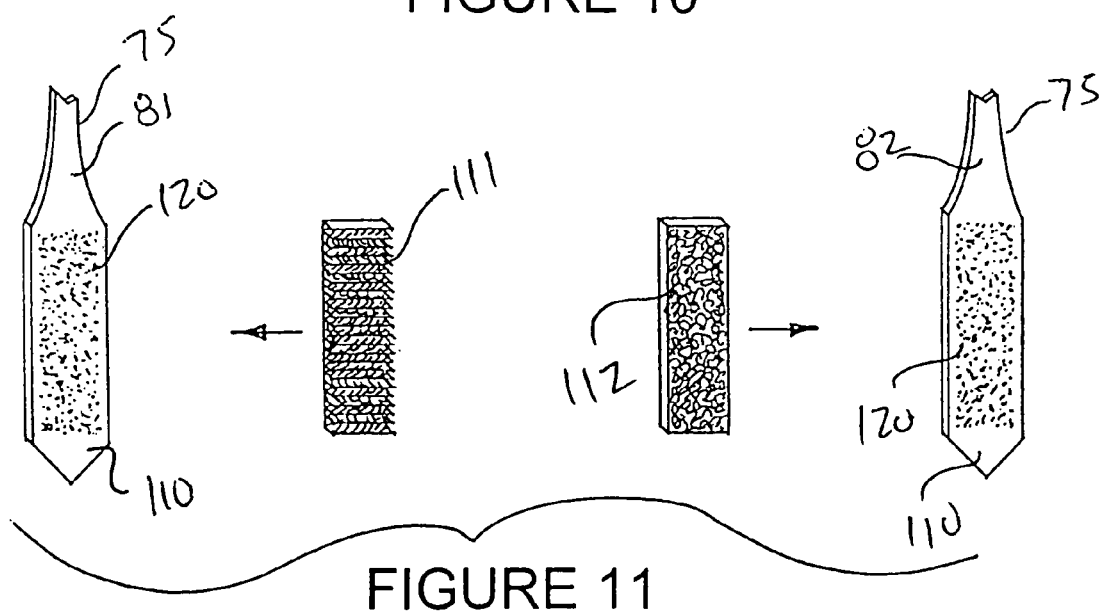

Consistent with the foregoing discussion of sunglasses, according to the invention there is provided a method of fabricating sunglasses 50 suitable for infants and children including 1) providing elongate integral member 60, elongate integral member 60 including central portion 70 (FIG. 5) having opposing outer and inner faces 71 and 72, central nose bridge 73, and a lens opening 74 on each side of central nose bridge 73; 2) providing lens-defining member 61 (FIG. 6), made of a flexible, thin, sun-protective, light-transmitting material, having opposing outer and inner faces 90 and 91, opposing sides 92, and that is substantially coextensive relative to central portion 70; 3) providing elongate integral backing 62 (FIG. 8) that is substantially coextensive relative to, and a substantial mirror image of central portion 70, backing 62 having opposing outer and inner faces 100 and 101, opposing sides 102, central nose bridge 103, and a lens opening 104 on each side of central nose bridge 103; 4) affixing outer face 90 of lens-defining member 61 to inner face 72 of central portion 70 (FIG. 7), and affixing outer face 100 of backing 62 to inner face 91 of lens-defining member 61 (FIG. 9), wherein sides 102 of lens-defining member 61 are juxtaposed relative to sides 102 of backing 62, respectively, in accordance with the principle of the invention and forming an exemplary embodiment of the invention. In accordance with the invention, a preferred method further includes 5) bending elongate integral member 60 rearwardly of inner face 72 at the juxtaposed sides 92 and 102 of lens-defining member 61 and backing 62, respectively, forming bends 76 (FIG. 9) and temples 75 in elongate integral member 60; 6) temples 75 each having outer face 81 that is congruent to outer face 71 of central portion 70 and inner face 82 that is congruent with inner face 72 of central portion 70; 7) providing nose bridge and temple pads 63,64A,64B (FIG. 10); 8) affixing nose bridge pad 63 to inner face 101 of backing 62 at nose bridge 103 thereof; and 9) affixing a temple pad 64A,64B to inner face 101 of backing 62 at each side 102 thereof and to inner face 82 of each of temples 75 maintaining bends 76 in elongate integral member 60. Temples 75 each have a free end 110, and the method further includes providing an engagement assembly for releasably retaining the free end 110 of one of temples 75 to the free end 110 of the other of temples 75 to form a head band for securing sunglasses 50 to a user's head. As previously disclosed, the engagement assembly includes a hook and loop fastener including element 111 thereof carried at free end 110 of one of temples 75 and complemental element 112 thereof carried at free end 110 of the other of temples 75. Referring to FIG. 11, the method includes providing element 111 and complemental element 112, and adhesively affixing element 111 to the free end 110 of one temple 75, and adhesively affixing complemental element 112 to the free end 110 of the other temple 75, which thus completes the fabrication of sunglasses 50 as presented in FIGS. 1–3.

Figure 5:
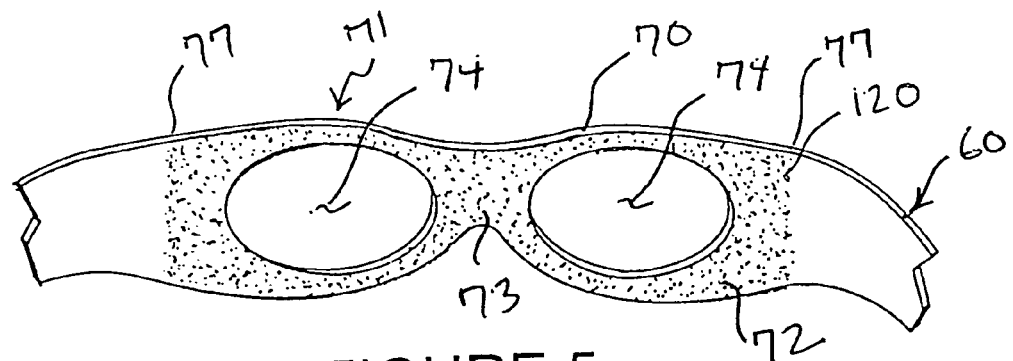
FIGS. 5–11 show the step of fabricating the sunglasses of FIG. 1.
Figure 6:
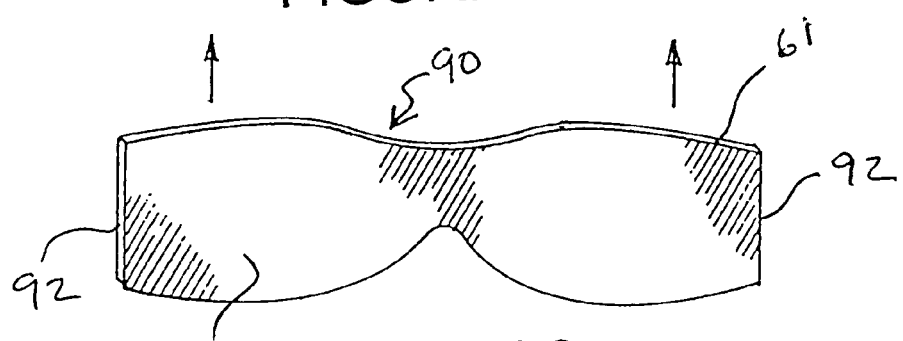
Figure 7:
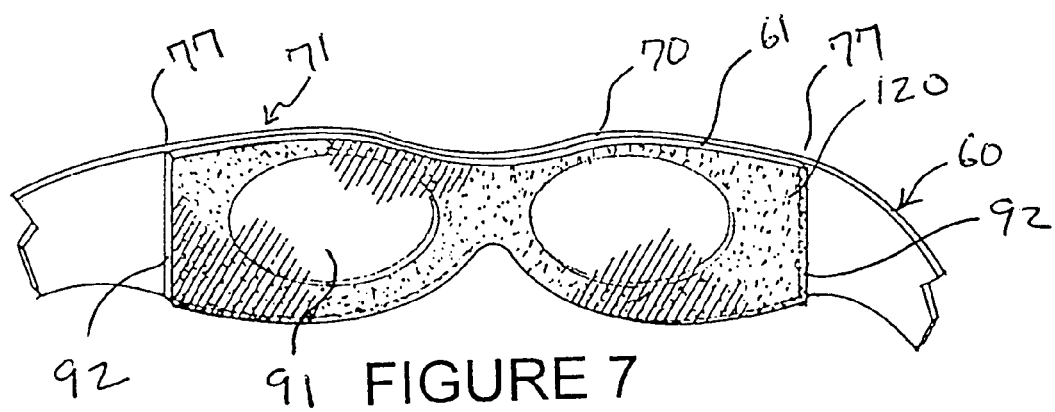
Figure 8:
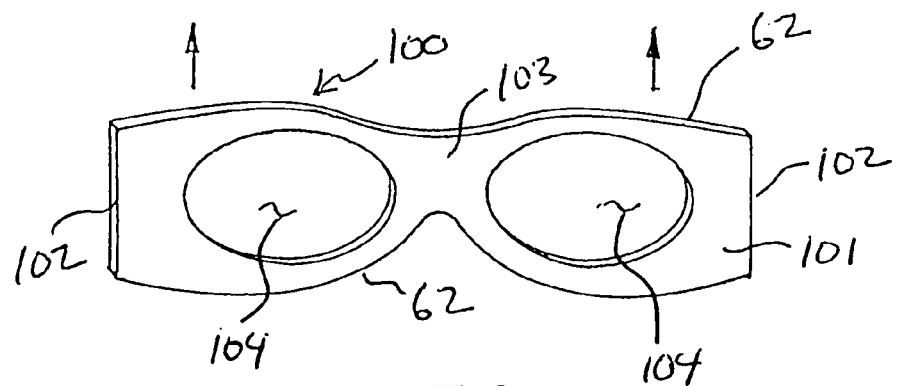

A suitable applied adhesive designated at 120 is used to affix outer face 90 of lens-defining member 61 to inner face 72 of central portion 70 (FIG. 5), and to affix outer face 100 of backing 62 to inner face 91 of lens-defining member 61 (FIG. 7). Adhesive 120 is applied with brushing, spreading, spraying, etc. In FIG. 5, adhesive 120 is applied to inner face 72 of central portion 70. In FIG. 7, adhesive 120 is applied to portions of inner face 91 of lens-defining member 61. In FIG. 11, adhesive 120 is applied to outer face 81 of the free end 110 of one temple 75 for adhesively affixing element 111, and to inner face 82 of the free end 110 of the other temple 75 for adhesively affixing element 112.

Figure 9:
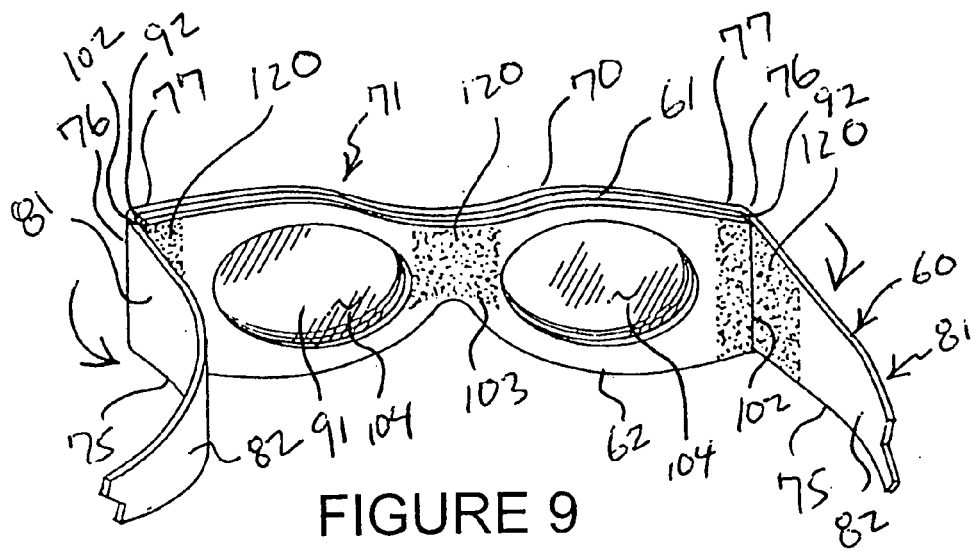

The step of affixing nose bridge pad 63 to inner face 101 of backing 62 at nose bridge 103 includes adhesively affixing a surface of nose bridge pad 63 to inner face 101 of backing 62 at nose bridge 103 with a suitable applied adhesive. In FIG. 9, adhesive 120 is applied to inner face 101 of backing 62 at nose bridge 103, which is used to adhesively affix nose bridge pad 63. The step of affixing a temple pad 64A,64B to inner face 101 of backing 62 at each side 102 thereof further includes adhesively affixing a surface of temple pad 64A,64B to inner face 101 of backing 62 at each side thereof. Furthermore, the step of affixing a temple pad 64A,64B to inner face 82 of each of temples 75 further includes adhesively affixing a surface of temple pad 64A, 64B to inner face 82 of each of temples 75. In FIG. 9, adhesive 120 is applied to inner face 101 of backing 62 at each side 102 thereof, and to inner face 82 of each of temples 75, which is used to adhesively affix the surfaces of temple pads 74A,74B.

Figure 12:
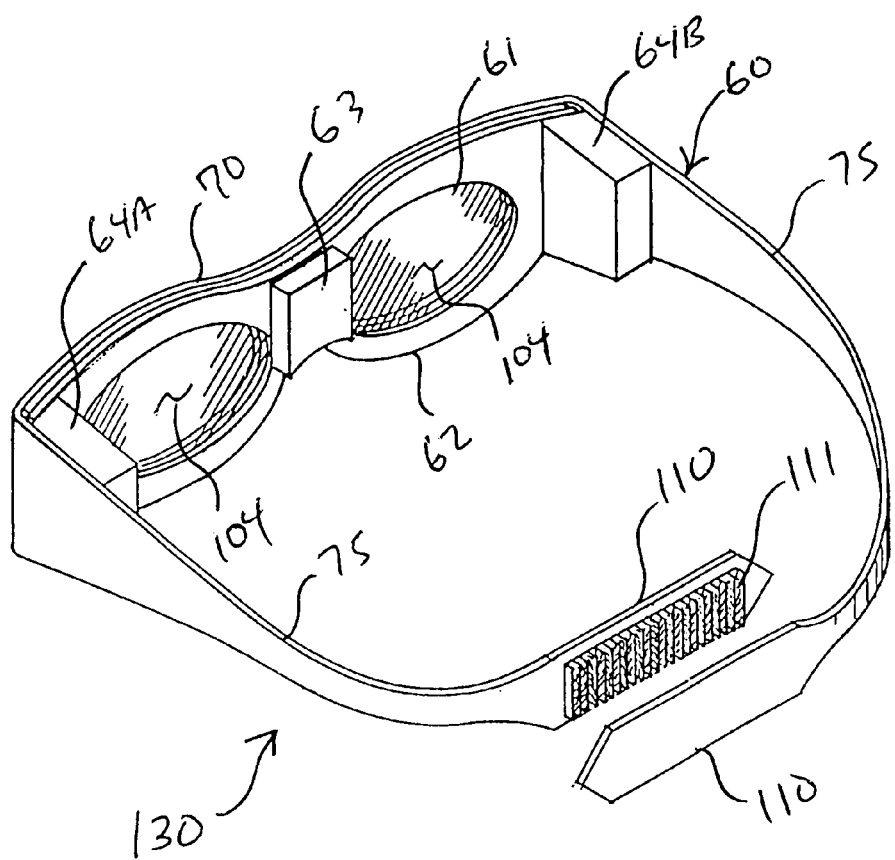
FIG. 12 is a perspective view of an alternate embodiment of sunglasses, constructed in accordance with the principles of the instant invention.
Figure 13:
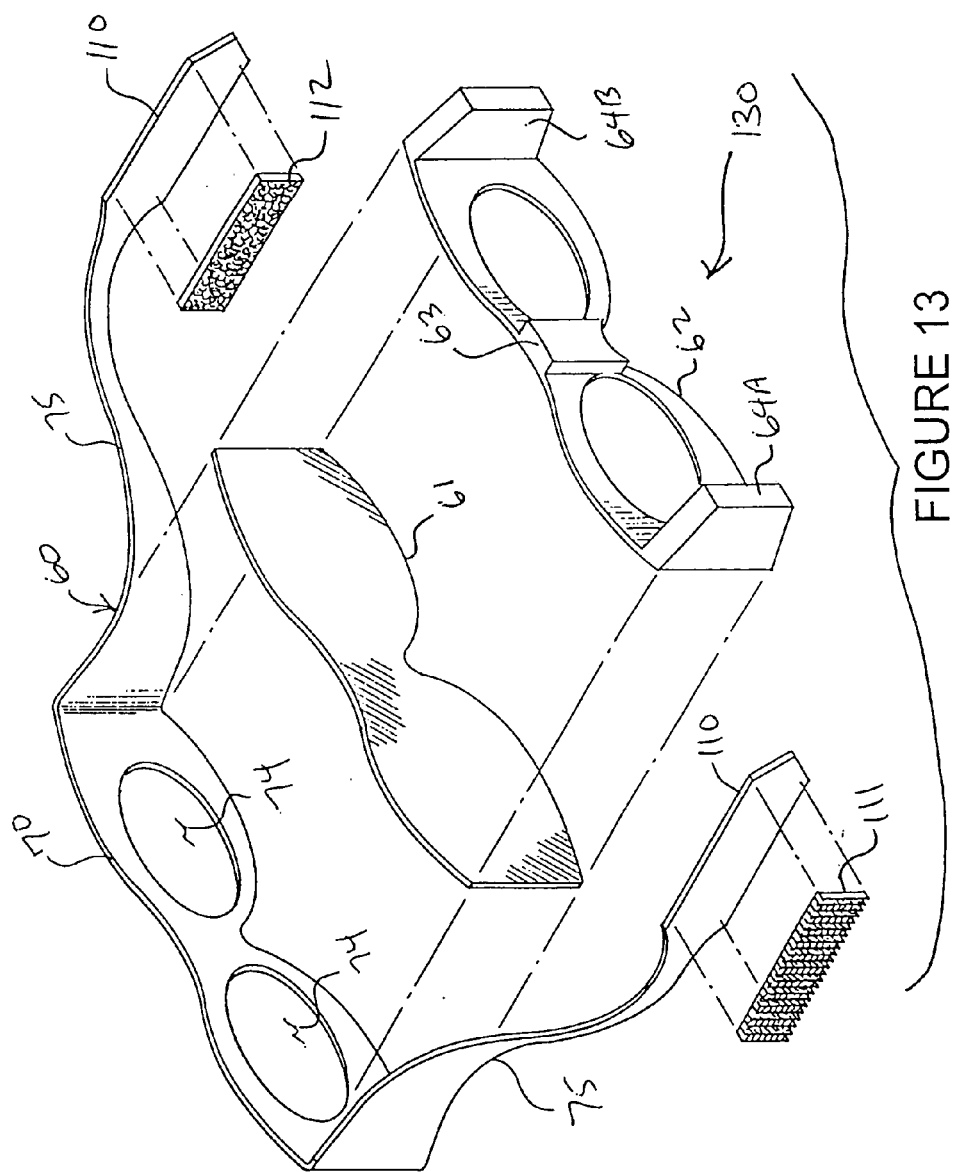
FIG. 13 is an exploded perspective view of the sunglasses of FIG. 12.

Reference is now made to FIGS. 12 and 13, in which there is seen an alternate embodiment of sunglasses designated generally at 130, embodying the principles of the instant invention. Save one difference, sunglasses 130 are fashioned of the same materials and are identical to sunglasses 50 and include the same elements including elongate member 60, lens-defining member 61, backing 62, nose bridge pad 63, and temple pads 64A and 64B, and the foregoing discussion of sunglasses 50 and the associated fabrication method applies to sunglasses 130, save for the one intimated difference. Unlike sunglasses 50, nose bridge pad 63 and temple pads 64A,64B of sunglasses 130 are integrally formed with backing 62, in which backing consists of an integral or single unit or piece formed with nose bridge pad 63 and temple pads 64A,64B. Other than this one difference, the structure of sunglasses 130 and its fabrication method are the same in all respects to the structure of sunglasses 50 and its fabrication method. Because nose bridge pad 63 and temple pads 64A,64B are integral with backing 62, such as through molding or by cutting backing 62 from a single piece of material, nose bridge pad 63 and temple pads 64A,64B are "integrally affixed," meaning that they are affixed to backing 62 by way of an integral affixation or formation. So, although nose bridge pad 63 and temple pads 64A,64B of sunglasses 50 are adhesively affixed to backing 62, nose bridge pad 63 and temple pads 64A,64B are integrally affixed to backing 62.

Figure 15:
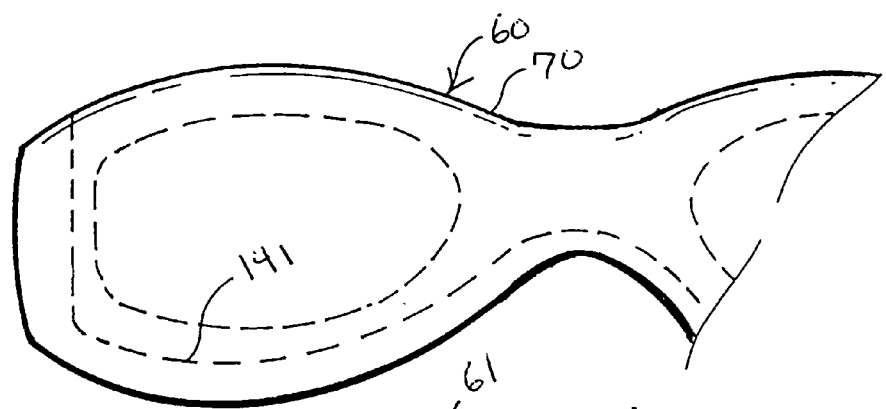
FIG. 15 is fragmentary, front schematic representation of the sunglasses of FIG. 14.
Figure 14:
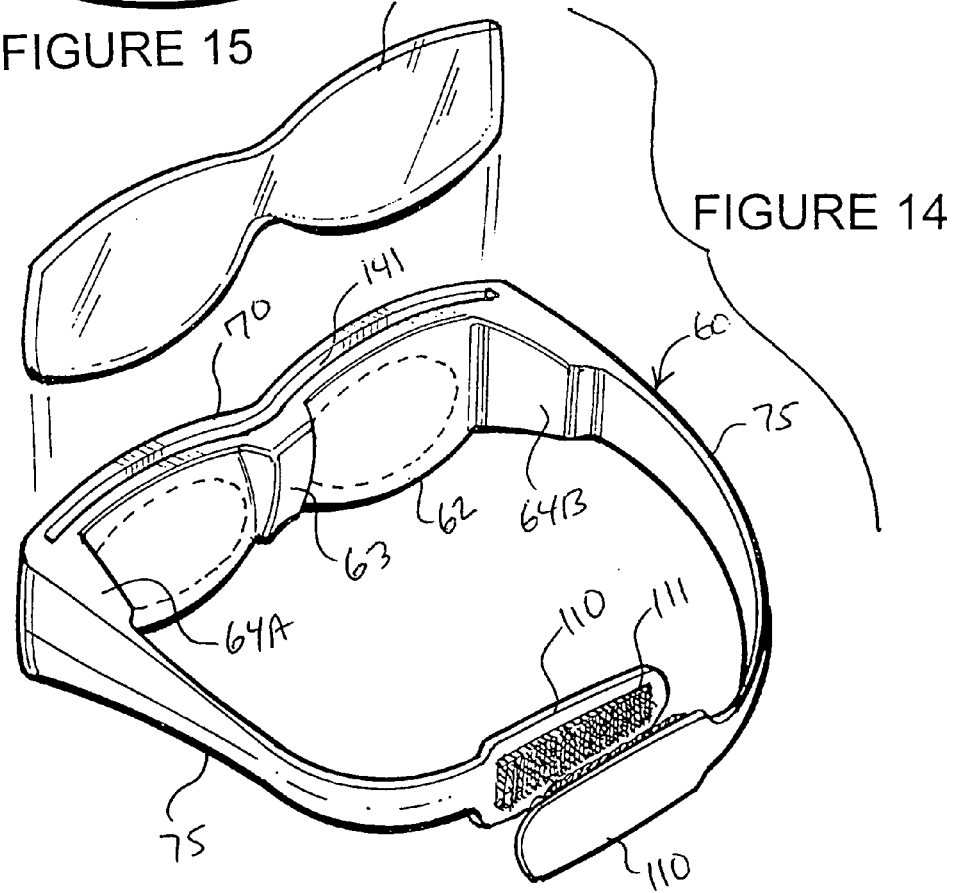
FIG. 14 is an exploded perspective view of yet another alternate embodiment of sunglasses, constructed in accordance with the principles of the instant invention.
Figure 16:
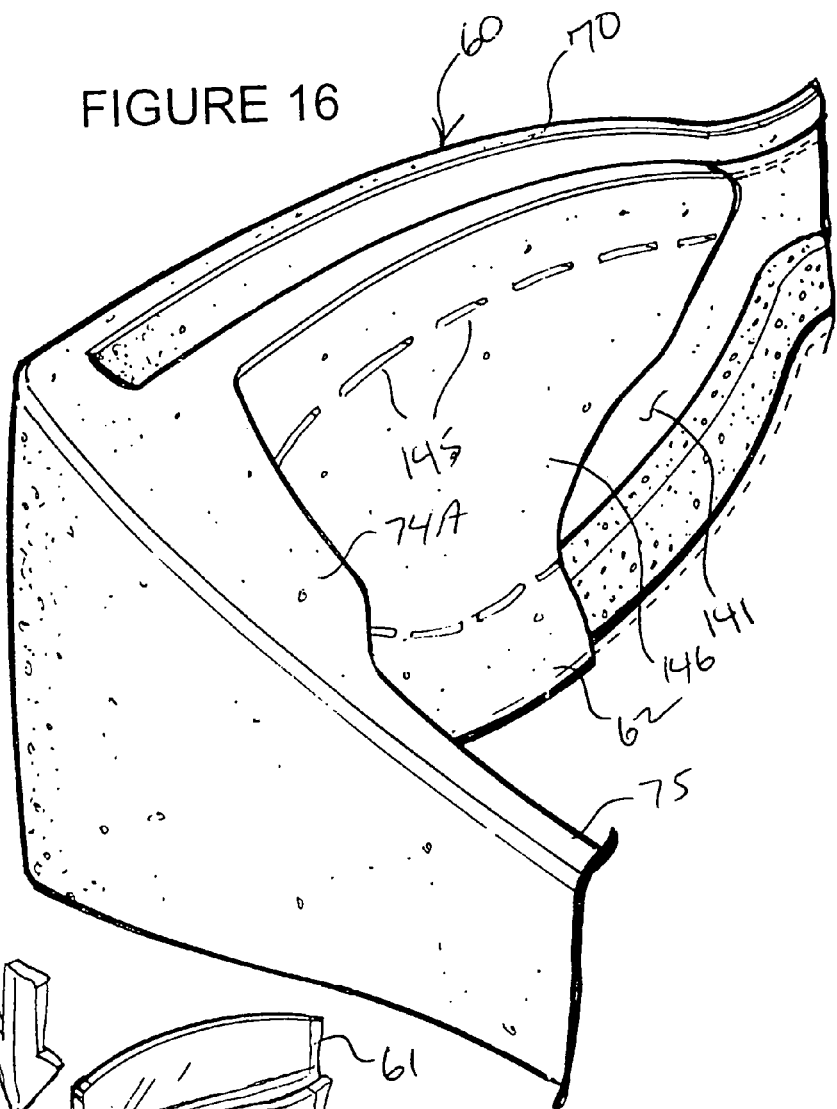
FIG. 16 is an enlarged fragmentary perspective view of the sunglasses of FIG. 14.
Figure 17:
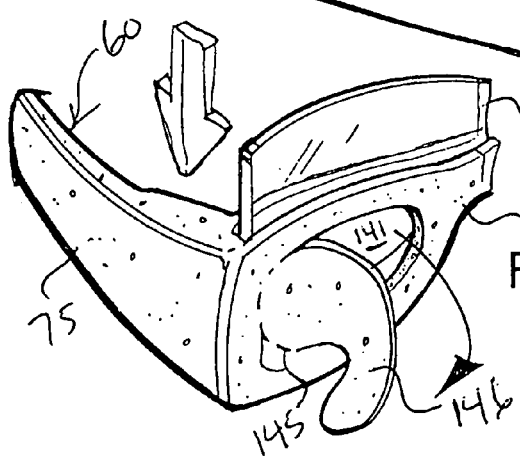
FIG. 17 is a fragmentary perspective view of the sunglasses of FIG. 14 with the lens-defining member shown as it would appear being inserted into a pocket of the sunglasses.

Referring to FIGS. 14–17, there is seen yet another alternate embodiment of sunglasses designated generally at 140, embodying the principles of the instant invention. Save two differences, sunglasses 140 are fashioned of the same materials and are identical to sunglasses 130 and include the same elements including elongate member 60, lens-defining member 61, and backing 62 including nose bridge pad 63, and temple pads 64A and 64B, and it is to be understood that the foregoing discussion of sunglasses 130 applies to sunglasses 130, save for the two intimated differences. Unlike sunglasses 130, member 60 and backing 62, including nose bridge pad 63 and temple pads 64A and 64B, are integrally formed as a single unit or frame, such as through molding or cutting from a single piece of material. A pocket 141 is formed between central portion 70 and backing 62, which accepts lens-defining member 61. Pocket 141 can be formed during a molding process, or by cutting, such as with a laser, knife, or other cutting or milling device. A suitable adhesive is used to adhesively affix lens-defining member 61 in pocket 141. FIG. 15 is a fragmentary, front schematic representation of the frame of FIG. 14, in which the boundary of pocket 141 is denoted in dotted outline.

Lens openings 74 (not shown) through central portion 70 and lens openings 104 (not shown) through backing 62 can be formed before lens-defining member 61 is positioned in pocket 141, or after. On the subject of the latter, and with reference to FIGS. 16 and 17, each lens opening can be formed by forming a parametric or continuous perforate line 145 defining a boundary of a lens opening and an internal section 146 of the frame that can be torn away or separated from the perforate line 145 to form the lens opening.

In sum, disclosed herein are exemplary embodiments of sunglasses which are specifically adapted to be worn by infants and children, which are easy to make, which are comfortable to wear, which have no sharp edges, which are disposable, and which are inexpensive. Preferably, the lens-defining member of the various embodiments of the invention has approximately a 98 Eye Protection Factor (EPF) according to the protective rating system for eyewear disclosed in U.S. Pat. No. 5,949,535, which is incorporated by referenced herein. As a matter of example, a removable, adhesive label 150 is applied to lens-defining member 61 in FIG. 2 which references an approximate 98 EPF. Providing lens-defining member with an EPF of approximately 98 ensures that sunglasses constructed and arranged in accordance with the principle of the invention will provide a user with exemplary protection from the sun's harmful UV light. Lens-defining member 61 can be provided with any predetermined EPF as may be desired.

The present invention is described above with reference to preferred embodiments. However, those skilled in the art will recognize that changes and modifications may be made in the described embodiments without departing from the nature and scope of the present invention. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Sunglasses for infants and children comprising:
   an elongate integral member including:
      a central portion having opposing outer and inner faces, a central nose bridge, and a lens opening on each side of the central nose bridge; and
      a temple extending rearwardly of the inner face from a bend in the elongate integral member on each side of the central portion, each of the temples having an outer face that is congruent with the outer face of the central portion and an inner face that is congruent with the inner face of the central portion;
   a lens-defining member, made of a flexible, thin, sun-protective, light-transmitting material, having an outer face affixed to the inner face of the central portion and an opposing inner face, wherein the lens-defining member is substantially coextensive relative to the central portion and has a side in juxtaposition to each of the bends of the central portion;
   an elongate integral backing having an outer face affixed to the inner face of the lens-defining member and an opposing inner face, wherein the backing is substantially coextensive relative to, and a substantial mirror image of, the central portion including a central nose bridge opposing the central nose bridge of the central portion, a lens opening on each side of the central nose bridge opposing the lens opening on each side of the central portion, and a side in juxtaposition to each of the bends of the central portion;
   a nose bridge pad affixed to the inner face of the backing at the nose bridge thereof; and
   a temple pad affixed to the inner face of the backing at each side thereof and to the inner face of each of the temples maintaining the bends in the elongate integral member.

2. The sunglasses according to claim 1, further comprising:
   the temples each having a free end; and
   means for releasably retaining the free end of one of the temples to the free end of the other of the temples.

3. The sunglasses according to claim 2, wherein the means includes a hook and loop fastener having an element thereof carried at the free end of one of the temples and a complemental element thereof carried at the free end of the other of the temples.

4. The sunglasses according to claim 1, wherein the elongate integral member is made of a foam material.

5. The sunglasses according to claim 1, wherein the backing is made of a foam material.

6. The sunglasses according to claim 1, wherein the nose bridge pad and the temple pads are each made of a foam material.

7. The sunglasses according to claim 1, wherein the nose bridge pad is adhesively affixed to the inner face of the backing.

8. The sunglasses according to claim 1, wherein the nose bridge pad is integrally affixed to the inner face of the backing.

9. The sunglasses according to claim 1, wherein the temple pads are adhesively affixed to the outer face of the backing.

10. The sunglasses according to claim 1, wherein the temple pads are adhesively affixed to the inner faces of the temples, respectively.

11. The sunglasses according to claim 1, wherein the temple pads are integrally affixed to the inner face of the backing.

12. A method of fabricating sunglasses suitable for infants and children including steps of:
    providing an elongate integral member, the elongate integral member including a central portion having opposing outer and inner faces, a central nose bridge, and a lens opening on each side of the central nose bridge;
    providing a lens-defining member, made of a flexible, thin, sun-protective, light-transmitting material, having opposing outer and inner faces, opposing sides, and that is substantially coextensive relative to the central portion;
    providing an elongate integral backing that is substantially coextensive relative to, and a substantial mirror image of, the central portion, the backing having opposing outer and inner faces, opposing sides, a central nose bridge, and a lens opening on each side of the central nose bridge;
    affixing the outer face of the lens-defining member to the inner face of the central portion, and affixing the outer face of the backing to the inner face of the lens-defining member, wherein the sides of the lens-defining member juxtaposed relative to the sides of the backing, respectively;
    bending the elongate integral member rearwardly of the inner face thereof at the juxtaposed sides of the lens-defining member and the backing forming bends and temples in the elongate integral member;
    the temples each having an outer face that is congruent to the outer face of the central portion and an inner face that is congruent with the inner face of the central portion;
    affixing a nose bridge pad to the inner face of the backing at the nose bridge thereof; and
    affixing a temple pad to the inner face of the backing at each side thereof and to the inner face of each of the temples maintaining the bends in the elongate integral member.

13. The method according to claim 12, further comprising:
    the temples each having a free end; and
    providing means for releasably retaining the free end of one of the temples to the free end of the other of the temples.

14. The method according to claim 13, wherein the means includes a hook and loop fastener having an element thereof carried at the free end of one of the temples and a complemental element thereof carried at the free end of the other of the temples.

15. The method according to claim 12, wherein the elongate integral member is made of a foam material.

16. The method according to claim 12, wherein the backing is made of a foam material.

17. The method according to claim 12, wherein the nose bridge pad and the temple pads are each made of a foam material.

18. The method according to claim 12, wherein the step of affixing the nose bridge pad further includes adhesively affixing the nose bridge pad.

19. The method according to claim 12, wherein the step of affixing the nose bridge pad further includes integrally affixing the nose bridge pad.

20. The method according to claim 12, wherein the step of affixing a temple pad to the inner face of the backing at each side thereof further includes adhesively affixing a temple pad to the inner face of the backing at each side thereof.

21. The method according to claim 12, wherein the step of affixing a temple pad to the inner face of each of the temples further includes adhesively affixing a temple pad to the inner face of each of the temples.

22. The method according to claim 12, wherein the step of affixing a temple pad to the inner face of the backing at each side thereof further includes integrally affixing a temple pad to the outer face of the backing at each side thereof.

23. Sunglasses for infants and children comprising:
   an elongate integral member including:
      a central portion having opposing outer and inner faces, a central nose bridge, and a lens opening on each side of the central nose bridge; and
      a temple extending rearwardly of the inner face from a bend in the elongate integral member on each side of the central portion, each of the temples having an outer face that is congruent with the outer face of the central portion and an inner face that is congruent with the inner face of the central portion;
   a lens-defining member, made of a flexible, thin, sun-protective, light-transmitting material, having an outer face affixed to the inner face of the central portion and an opposing inner face, wherein the lens-defining member is substantially coextensive relative to the central portion and has a side in juxtaposition to each of the bends of the central portion;
   an elongate integral backing affixed to the inner face of the lens-defining member including a central nose bridge opposing the central nose bridge of the central portion, a lens opening on each side of the central nose bridge opposing the lens opening on each side of the central portion, a side in juxtaposition to each of the bends of the central portion, a nose bridge pad at the nose bridge of the backing, and a temple pad at each side of the backing and affixed to the inner face of each of the temples maintaining the bends in the elongate integral member.

24. The sunglasses according to claim 23, further comprising:
   the temples each having a free end; and
   means for releasably retaining the free end of one of the temples to the free end of the other of the temples.

25. The sunglasses according to claim 24, wherein the means includes a hook and loop fastener having an element thereof carried at the free end of one of the temples and a complemental element thereof carried at the free end of the other of the temples.

26. The sunglasses according to claim 23, wherein the elongate integral member is made of a foam material.

27. The sunglasses according to claim 23, wherein the backing is made of a foam material.

28. A method of fabricating sunglasses suitable for infants and children including steps of:
   providing an elongate integral member, the elongate integral member including a central portion having opposing outer and inner faces, a central nose bridge, and a lens opening on each side of the central nose bridge;
   providing a lens-defining member, made of a flexible, thin, sun-protective, light-transmitting material, having opposing outer and inner faces, opposing sides, and that is substantially coextensive relative to the central portion;
   providing an elongate integral backing that is substantially coextensive relative to the central portion, the backing having a central nose bridge, a lens opening on each side of the central nose bridge, opposing sides, a nose bridge pad at the nose bridge of the backing, and a temple pad at each side of the backing;
   affixing the outer face of the lens-defining member to the inner face of the central portion, and affixing the backing to the inner face of the lens-defining member, wherein the sides of the lens-defining member juxtaposed relative to the sides of the backing, respectively;
   bending the elongate integral member rearwardly of the inner face thereof at the juxtaposed sides of the lens-defining member and the backing forming bends and temples in the elongate integral member;
   the temples each having an outer face that is congruent to the outer face of the central portion and an inner face that is congruent with the inner face of the central portion; and
   affixing the temple pads to the inner faces of the temples, respectively, maintaining the bends in the elongate integral member.

29. The method according to claim 28, further comprising:
   the temples each having a free end; and
   providing means for releasably retaining the free end of one of the temples to the free end of the other of the temples.

30. The method according to claim 29, wherein the means includes a hook and loop fastener having an element thereof carried at the free end of one of the temples and a complemental element thereof carried at the free end of the other of the temples.

31. The method according to claim 28, wherein the elongate integral member is made of a foam material.

32. The method according to claim 28, wherein the backing is made of a foam material.

33. The method according to claim 28, wherein the step of affixing the temple pads to the inner faces of the temples, respectively, further includes adhesively affixing the temple pads to the inner faces of the temples, respectively.

34. Sunglasses for infants and children comprising:
   an elongate integral member including:
      a central portion having opposing outer and inner faces, a central nose bridge, and a lens opening on each side of the central nose bridge; and
      a temple extending rearwardly of the inner face from a bend in the elongate integral member on each side of the central portion, each of the temples having an outer face that is congruent with the outer face of the central portion and an inner face that is congruent with the inner face of the central portion;
   a lens-defining member, made of a flexible, thin, sun-protective, light-transmitting material, having an outer face affixed to the inner face of the central portion and an opposing inner face, wherein the lens-defining member is substantially coextensive relative to the central portion and has a side in juxtaposition to each of the sides of the central portion; and
   an elongate integral backing having an outer face affixed to the inner face of the lens-defining member and an opposing inner face, wherein the backing is substantially coextensive relative to, and a substantial mirror image of, the central portion including a central nose bridge opposing the central nose bridge of the central portion, a lens opening on each side of the central nose bridge opposing the lens opening on each side of the central portion, a side in juxtaposition to each of the sides of the central portion, and a temple pad at each side of the backing and affixed to the inner face of each of the temples maintaining the bends in the elongate integral member.

35. The sunglasses according to claim 34, further comprising a nose bridge pad affixed to the inner face of the backing at the nose bridge thereof.

36. The sunglasses according to claim 35, wherein the nose bridge pad is made of a foam material.

37. The sunglasses according to claim 35, wherein the nose bridge pad is adhesively affixed to the inner face of the backing.

38. The sunglasses according to claim 35, wherein the nose bridge pad is integrally affixed to the inner face of the backing.

39. The sunglasses according to claim 34, further comprising:
the temples each having a free end; and
means for releasably retaining the free end of one of the temples to the free end of the other of the temples.

40. The sunglasses according to claim 39, wherein the means includes a hook and loop fastener having an element thereof carried at the free end of one of the temples and a complemental element thereof carried at the free end of the other of the temples.

41. The sunglasses according to claim 34, wherein the elongate integral member is made of a foam material.

42. The sunglasses according to claim 34, wherein the backing is made of a foam material.

43. A method of fabricating sunglasses suitable for infants and children including steps of:
providing an elongate integral member, the elongate integral member including a central portion having opposing outer and inner faces, a central nose bridge, and a lens opening on each side of the central nose bridge;
providing a lens-defining member, made of a flexible, thin, sun-protective, light-transmitting material, having opposing outer and inner faces, opposing sides, and that is substantially coextensive relative to the central portion;
providing an elongate integral backing that is substantially coextensive relative to, and a substantial mirror image of, the central portion, the backing having opposing outer and inner faces, opposing sides, a central nose bridge, a lens opening on each side of the central nose bridge, and a temple a pad formed at each side of the backing;
affixing the outer face of the lens-defining member to the inner face of the central portion, and affixing the outer face of the backing to the inner face of the lens-defining member, wherein the sides of the lens-defining member juxtaposed relative to the sides of the backing, respectively;
bending the elongate integral member rearwardly of the inner face thereof at the juxtaposed sides of the lens-defining member and the backing forming bends and temples in the elongate integral member;
the temples each having an outer face that is congruent to the outer face of the central portion and an inner face that is congruent with the inner face of the central portion; and
affixing the temple pads to the inner faces of the temples, respectively, maintaining the bends in the elongate integral member.

44. The method according to claim 43, further comprising affixing a nose bridge pad to the inner face of the backing at the nose bridge thereof.

45. The method according to claim 44, wherein the nose bridge pad is made of a foam material.

46. The method according to claim 44, wherein the step of affixing the nose bridge pad further includes adhesively affixing the nose bridge pad.

47. The method according to claim 44, wherein the step of affixing the nose bridge pad further includes integrally affixing the nose bridge pad.

48. The method according to claim 43, further comprising:
the temples each having a free end; and
providing means for releasably retaining the free end of one of the temples to the free end of the other of the temples.

49. The method according to claim 48, wherein the means includes a hook and loop fastener having an element thereof carried at the free end of one of the temples and a complemental element thereof carried at the free end of the other of the temples.

50. The method according to claim 43, wherein the elongate integral member is made of a foam material.

51. The method according to claim 43, wherein the backing is made of a foam material.

* * * * *